(12) United States Patent
Mendonsa et al.

(10) Patent No.: US 10,147,454 B1
(45) Date of Patent: Dec. 4, 2018

(54) HEAT-ASSISTED MAGNETIC RECORDING DEVICE CAPABLE OF DETECTING DEGRADATION OF NFT BY MEASURING BACK-HEAT FROM MEDIUM

(71) Applicant: Seagate Technology LLC, Cupertino, CA (US)

(72) Inventors: Riyan Mendonsa, Minneapolis, MN (US); Jon D. Trantham, Chanhassen, MN (US); James Dillon Kiely, Edina, MN (US); Peng Li, Minneapolis, MN (US); Joshua Ward Christensen, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/594,812

(22) Filed: May 15, 2017

(51) Int. Cl.
| | |
|---|---|
| *G11B 11/00* | (2006.01) |
| *G11B 13/04* | (2006.01) |
| *G11B 13/08* | (2006.01) |
| *G11B 20/18* | (2006.01) |
| *G11B 5/60* | (2006.01) |
| *G11B 5/00* | (2006.01) |
| *G11B 7/126* | (2012.01) |

(52) U.S. Cl.
CPC ............ *G11B 13/045* (2013.01); *G11B 13/08* (2013.01); *G11B 20/1816* (2013.01); *G11B 5/6088* (2013.01); *G11B 7/126* (2013.01); *G11B 2005/0021* (2013.01)

(58) Field of Classification Search
USPC .... 369/13.01–13.55, 112.09, 112.14, 112.21, 369/112.27, 300; 360/59, 123.02–125.75, 360/131; 29/603.07–603.27
See application file for complete search history.

(56) References Cited

U.S. PATENT DOCUMENTS

| | | | |
|---|---|---|---|
| 7,450,343 B2 | 11/2008 | Huang | |
| 7,715,135 B1 | 5/2010 | Sutardja et al. | |
| 8,593,753 B1 | 11/2013 | Anderson | |
| 8,654,618 B1 * | 2/2014 | Liu | G11B 5/314 369/13.33 |
| 8,873,353 B1 * | 10/2014 | Riddering | G11B 5/314 369/13.33 |

(Continued)

OTHER PUBLICATIONS

U.S. Appl. No. 15/190,462, Kiely et al., filed Jun. 23, 2016.

*Primary Examiner* — Tan X Dinh
(74) *Attorney, Agent, or Firm* — Hollingsworth Davis, LLC

(57) ABSTRACT

An apparatus comprises a laser diode configured to generate light during a write operation. A slider comprises a near-field transducer (NFT) and an optical waveguide. The slider is configured for heat-assisted magnetic recording and to communicate the light to the NFT via the waveguide. A writer heater of the slider is configured to receive power during the write operation. A thermal sensor is situated at or near an air bearing surface of the slider. The thermal sensor is configured to produce a sensor signal in response to sensing back-heating from the medium while the NFT generates heat during a write operation. Circuitry, coupled to the thermal sensor, is configured to compare the sensor signal to a threshold and generate an output signal indicative of degradation of NFT performance in response to the sensor signal exceeding the threshold.

18 Claims, 15 Drawing Sheets

(56) References Cited

U.S. PATENT DOCUMENTS

| | | | |
|---|---|---|---|
| 8,891,341 B1* | 11/2014 | Krichevsky | G11B 5/02 |
| | | | 369/13.13 |
| 8,937,853 B2 | 1/2015 | Zheng et al. | |
| 9,153,276 B2 | 10/2015 | Johnson et al. | |
| 9,202,499 B2 | 12/2015 | Kiely et al. | |
| 9,311,943 B2 | 4/2016 | Canchi et al. | |
| 9,454,986 B2 | 9/2016 | Johnson et al. | |
| 9,548,068 B1* | 1/2017 | Rausch | G11B 5/012 |
| | | | 369/13.33 |
| 2003/0202273 A1 | 10/2003 | Smith | |
| 2006/0044658 A1 | 3/2006 | Ma | |
| 2008/0239581 A1 | 10/2008 | Ikai et al. | |
| 2009/0168268 A1 | 7/2009 | Druist et al. | |
| 2011/0235207 A1 | 9/2011 | Yang | |
| 2012/0120521 A1 | 5/2012 | Kurita | |
| 2012/0300599 A1* | 11/2012 | Contreras | G11B 5/02 |
| | | | 369/13.24 |
| 2013/0107680 A1 | 5/2013 | Contreras et al. | |
| 2013/0286807 A1 | 10/2013 | Gao et al. | |
| 2014/0177090 A1* | 6/2014 | Contreras | G11B 5/6029 |
| | | | 360/75 |
| 2015/0085632 A1* | 3/2015 | Kiely | G11B 5/41 |
| | | | 369/13.33 |
| 2015/0235663 A1 | 8/2015 | Canchi et al. | |
| 2015/0262596 A1* | 9/2015 | Zuckerman | G11B 5/4866 |
| | | | 369/13.13 |
| 2016/0104514 A1* | 4/2016 | Burnett | G11B 5/6088 |
| | | | 369/13.33 |
| 2016/0293203 A1* | 10/2016 | Zhang | G11B 19/048 |
| | | | 369/13.33 |

* cited by examiner

US 10,147,454 B1

HEAT-ASSISTED MAGNETIC RECORDING DEVICE CAPABLE OF DETECTING DEGRADATION OF NFT BY MEASURING BACK-HEAT FROM MEDIUM

SUMMARY

Embodiments are directed to a method comprising moving a slider configured for heat-assisted magnetic recording relative to a magnetic recording medium. The slider comprises a writer, a writer heater, a thermal sensor, and a near-field transducer (NFT). The method comprises repeatedly measuring, while the NFT generates heat when writing to the medium, back-heating from the medium using the thermal sensor. The method also comprises comparing back-heating measurements made by the thermal sensor to a threshold, and generating an output signal indicative of NFT performance degradation in response to a back-heating measurement exceeding the threshold.

Embodiments are directed to an apparatus comprising a laser diode configured to generate light during a write operation. A slider comprises a near-field transducer (NFT) and an optical waveguide. The slider is configured for heat-assisted magnetic recording and to communicate the light to the NFT via the waveguide. A writer heater of the slider is configured to receive power during the write operation. A thermal sensor is situated at or near an air bearing surface of the slider. The thermal sensor is configured to produce a sensor signal in response to sensing back-heating from the medium while the NFT generates heat during a write operation. Circuitry, coupled to the thermal sensor, is configured to compare the sensor signal to a threshold and generate an output signal indicative of degradation of NFT performance in response to the sensor signal exceeding the threshold.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to superparamagnetic effects that can lead to data errors.

Figure 1:
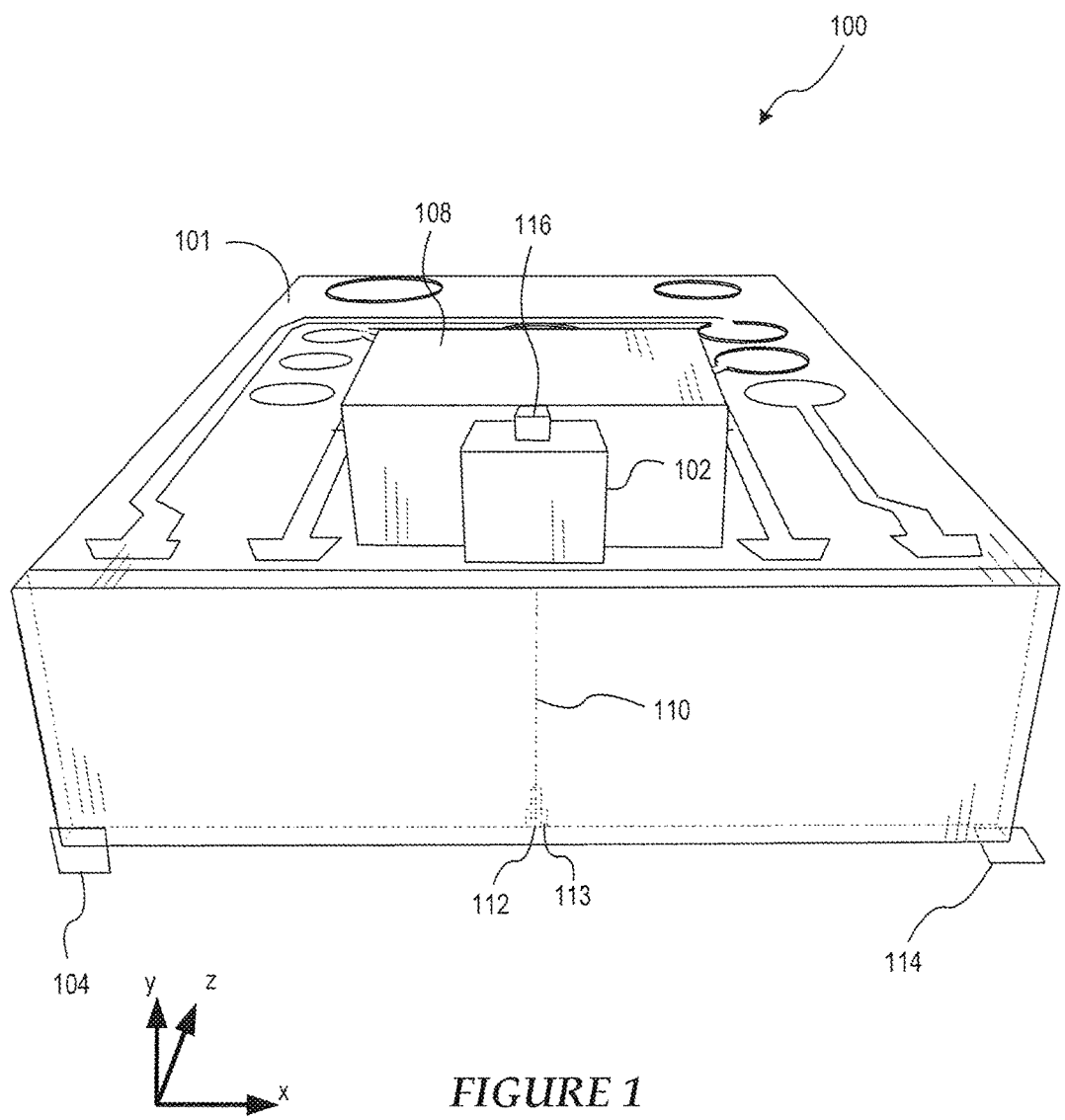
FIG. 1 is a perspective view of a HAMR slider with which various embodiments disclosed herein may be implemented.
Figure 2:
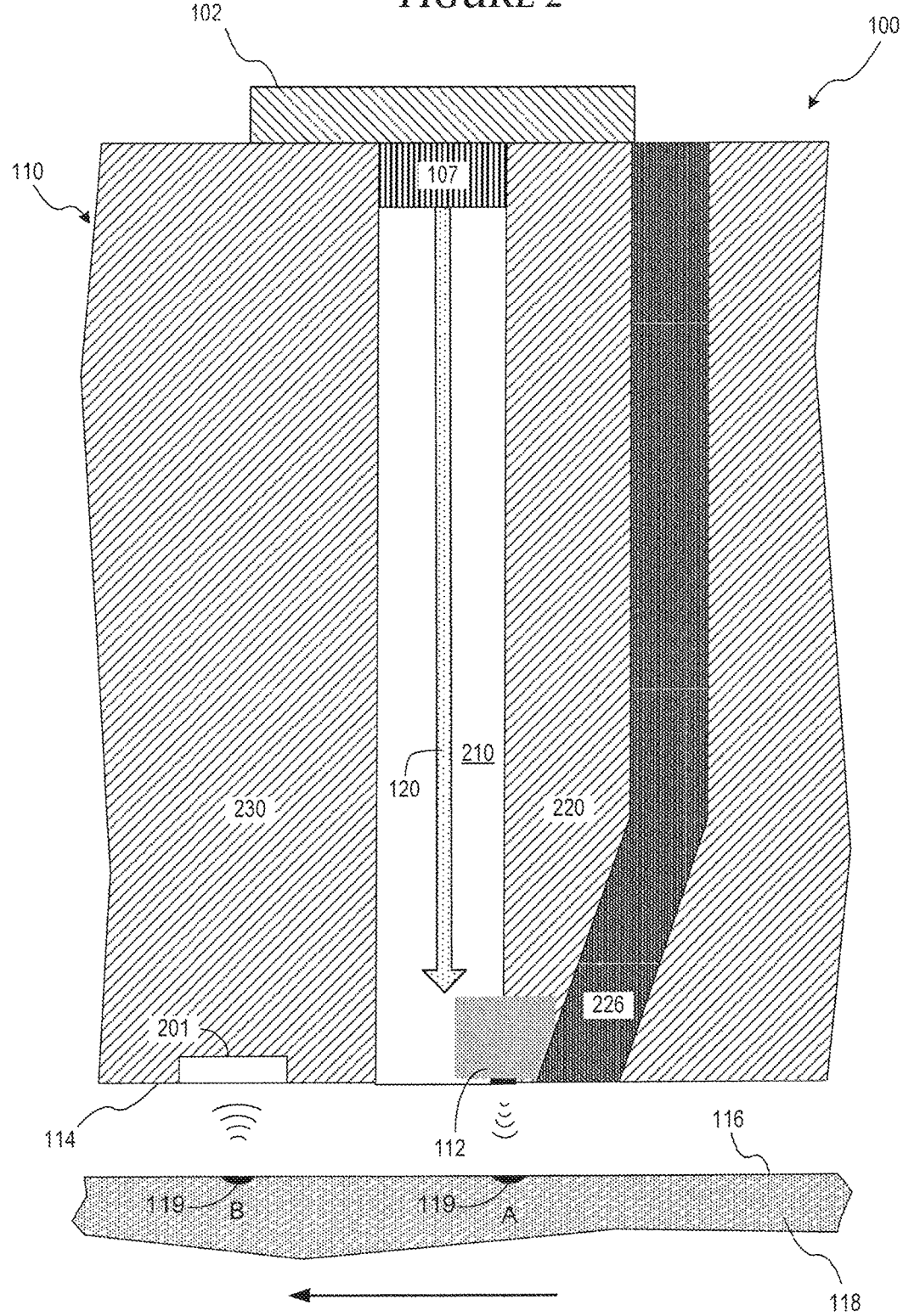
FIG. 2 is a cross-sectional view of a HAMR slider with which various embodiments disclosed herein may be implemented.

Embodiments of a HAMR slider 100 are illustrated in FIGS. 1 and 2. As shown, the slider 100 (also referred to as a recording head) includes a light source (e.g., a laser diode) 102 located proximate a trailing edge surface 104 of the slider body 101. An optical wave (e.g., a laser beam) 120 generated by the light source 102 is delivered to an NFT 112 via an optical waveguide 110. The NFT 112 is aligned with a plane of an air bearing surface (ABS) 114 of the slider 100, and one edge of a read/write head 113 is on the ABS 114. The read/write head 113 includes at least one writer and at least one reader. In some embodiments, multiple writers (e.g., 2 writers) and multiple readers (e.g., 3 readers) can be incorporated into the read/write head 113. The ABS 114 faces, and is held proximate to, a surface 116 of a magnetic medium 118 during device operation. The ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the slider 100, such as the trailing edge surface 104. In some embodiments, a laser diode 102 can be built into the slider 100 itself. For example, the laser diode 102 can be fabricated directly as part of the slider 100 itself. As another example, the laser diode 102 can be a separate component that is directly embedded inside the slider 100, rather than on top or alongside of the slider 100 as is shown in the embodiments illustrated in FIGS. 1 and 2. While the representative embodiments of FIGS. 1 and 2 show the waveguide 110 integrated with the slider 100, any type of light delivery configuration may be used. As shown in FIG. 1, the laser diode 102 is shown coupled to the slider body 101 via a submount 108. The submount 108 can be used to orient and affix an edge-emitting laser diode 102 so that its output is directed downwards (negative y-direction in the figure). An input surface of the slider body 101 may include a grating, an optical coupler, or other coupling features to receive light from the laser diode 102.

The light from the light source 102 propagates to the NFT 112, e.g., either directly from the light source 102 or through a mode converter or by way of a focusing element. FIG. 2, for example, shows an optical coupler 107 adjacent the light source 102, which is configured to couple light produced from the light source 102 to the waveguide 110. When writing with a HAMR device, electromagnetic energy is concentrated onto a small hotspot 119 over the track of the magnetic medium 118 where writing takes place, as is shown in the embodiment of FIG. 2. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hotspot 119 is on the order of 50 nm or less. Thus, the desired hotspot size is well below half the wavelength of the light. Optical focusers cannot be used to obtain the desired hotspot size, being diffraction limited at this scale. As a result, the NFT 112 is employed to create a hotspot on the media. It is noted that the term hotspot as used herein can refer to an optical spot and/or a thermal spot on the magnetic medium 118. For example, the NFT 112 creates an optical spot on the recording medium 118 which, in turn, generates a larger thermal spot on the recording medium.

The NFT 112 is a near-field optics device configured to generate local surface plasmon resonance at a designated (e.g., design) wavelength. The NFT 112 is generally formed from a thin film of plasmonic material on a substrate. In a HAMR slider 100, the NFT 112 is positioned proximate the write pole 226 of the read/write head 113. The NFT 112 is aligned with the plane of the ABS 114 parallel to the surface 116 of the magnetic medium 118. The waveguide 110 and optional mode converter 107 and/or other optical element directs electromagnetic energy 120 (e.g., laser light) onto the NFT 112. The NFT 112 achieves surface plasmon resonance in response to the incident electromagnetic energy 120. The plasmons generated by this resonance are emitted from the NFT 112 towards the magnetic medium 118 where they are absorbed to create a hotspot 119. At resonance, a high electric field surrounds the NFT 112 due to the collective oscillations of electrons at the metal surface (e.g., substrate) of the magnetic medium 118. At least a portion of the electric field surrounding the NFT 112 gets absorbed by the magnetic medium 118, thereby raising the temperature of a spot 119 on the medium 118 as data is being recorded.

FIG. 2 shows a detailed partial cross-sectional view of an embodiment of the HAN/JR slider 100 in accordance with various embodiments. The waveguide 110 includes a layer of core material 210 surrounded by first and second cladding layers 220 and 230. The first cladding layer 220 is shown proximate the NFT 112 and the write pole 226. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. The first and second cladding layers 220 and 230 may each be made of the same or a different material. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

According to some embodiments, the slider 100 includes one or more sensors, such as the thermal sensor 201 shown in FIG. 2. In some embodiments, the thermal sensor 201 can be a contact sensor configured to sense for one or more of head-medium contact, thermal asperities, and voids of a magnetic recording medium. In other embodiments, the thermal sensor 201 can be a bolometer or a combined contact sensor/bolometer. The thermal sensor 201 can be a resistive sensor, such as a resistive temperature sensor (e.g., TCR sensor). For example, the thermal sensor 201 can be implemented as a DETCR (Dual Ended Thermal Coefficient of Resistance) sensor. The thermal sensor 201 can alternatively be implemented as a ground-split TCR sensor, where one contact of the thermal sensor 201 is coupled to a bias source and the other contact is coupled to ground. The thermal sensor 201 can be a thermo-resistive/electric sensor, a thermocouple, a thermistor or other type of thermal sensor. The thermal sensor 201 can be a sensor configured to sense an optical spot on a magnetic recording medium. For example, the thermal sensor 201 can be implemented as an infrared temperature sensor. The thermal sensor 201 can be a sensor configured to sense at frequencies corresponding to the laser diode frequency. A wide variety of thermal sensors 201 are contemplated, including metallic and semiconductor sensors. Suitable thermal sensors 201 include those that can measure the temperature of a magnetic recording medium at a location (e.g., a hotspot, such as an optical spot or a thermal spot) heated by the NFT 112 of the slider 100. The thermal sensor 201 can be situated at or near the ABS 114.

As is shown in FIG. 2, heat produced by the NFT 112 creates a hotspot 119 at location A of the magnetic medium 118. Due to rotation of the magnetic medium 118 relative to the slider 100, the hotspot 119 moves to a location B proximate the thermal sensor 201. At or near location B of the magnetic medium 118, the thermal sensor 201 senses heat emanating from the hotspot 119 at location B. The heat emanating from the recording medium 118 and sensed by the thermal sensor 201 is referred to as media back-heating. The magnitude of the back-heating sensed by the thermal sensor 201 is proportional to the heat generated by the NFT 112. For example, a change in the magnitude of the media back-heating corresponds to a concomitant change in the heat generated by the NFT 112. As such, the performance of the NFT 112 can be determined by monitoring back-heating from the recording medium 118 using the thermal sensor 201. For example, it is been observed that the heat generated by the NFT 112 during writing can decrease due to degradation of or damage to the NFT 112. A change in the magnitude of heat generated by the NFT 112 indicated by a concomitant change in media back-heating measured by the sensor 201 relative to a threshold can indicate degradation of NFT performance.

Figure 3:
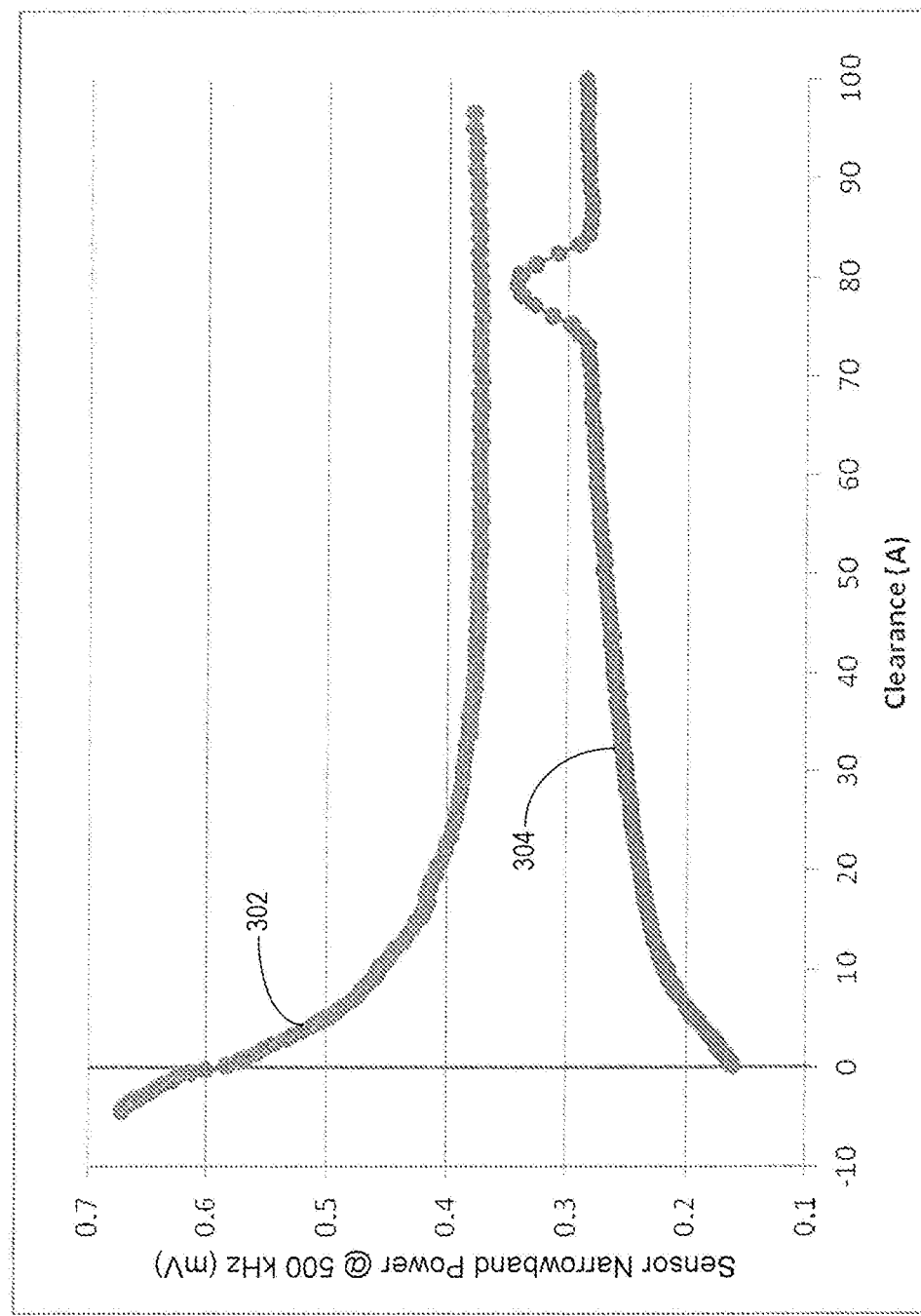
FIG. 3 illustrates the impact of media back-heating on the response of a sensor of a HAMR slider in accordance with various embodiments.

FIG. 3 illustrates the impact of media back-heating on the response of a thermal sensor of a HAMR slider, such as thermal sensor 201 shown in FIG. 2. FIG. 3 shows how narrowband power (in mV) of the thermal sensor changes as a function of clearance (in A) between the slider and the rotating medium during a write operation. To produce the data shown in FIG. 3, the writer heater of the HAMR slider was varied and the response of the thermal sensor was measured at a frequency of 500 kHz, which corresponds to the frequency of modulated current (having a constant mean amplitude) supplied to the laser diode during the write operation.

Curve 302 shows the response of the thermal sensor when writing to a recording medium configured for HAMR. As the clearance between the slider and HAMR medium is reduced, more heat from back-heating reaches the thermal sensor, resulting in an increased response of the thermal sensor. Curve 302 demonstrates that media back-heating causes a rise in the temperature of the thermal sensor as the sensor approaches the HAMR medium. Curve 304 shows the response of the thermal sensor when writing to a substrate that dissipates heat generated by HAMR. The data for curve 304 was generated while writing to a medium formed from silicon, which is a good heat sink material. Curve 304 shows the absence of back-heating and an increased heat transfer coefficient which causes a drop in temperature as the thermal sensor approaches the cool surface of the silicon medium. Because the back-heating from the silicon medium does not contribute to the thermal sensor response, the sensor response decreases as the head-media separation is reduced. FIG. 3 demonstrates that media back-heating can be measured using a thermal sensor of a HAMR slider during write operations, which allows for monitoring changes in the health of the NFT.

Figure 4:
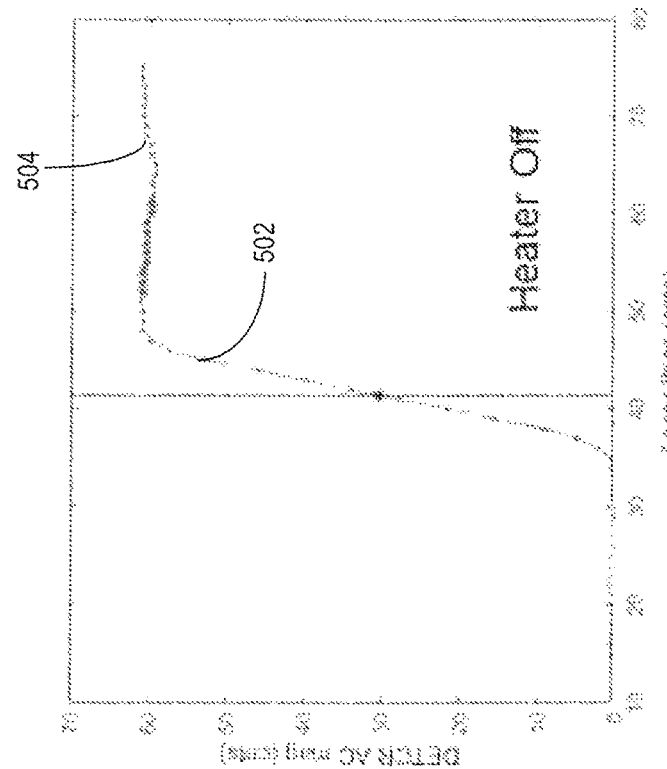
FIG. 4 shows the response of a thermal sensor of a HAMR slider at an active clearance setting of the writer heater during a write operation in accordance with various embodiments.
Figure 5:
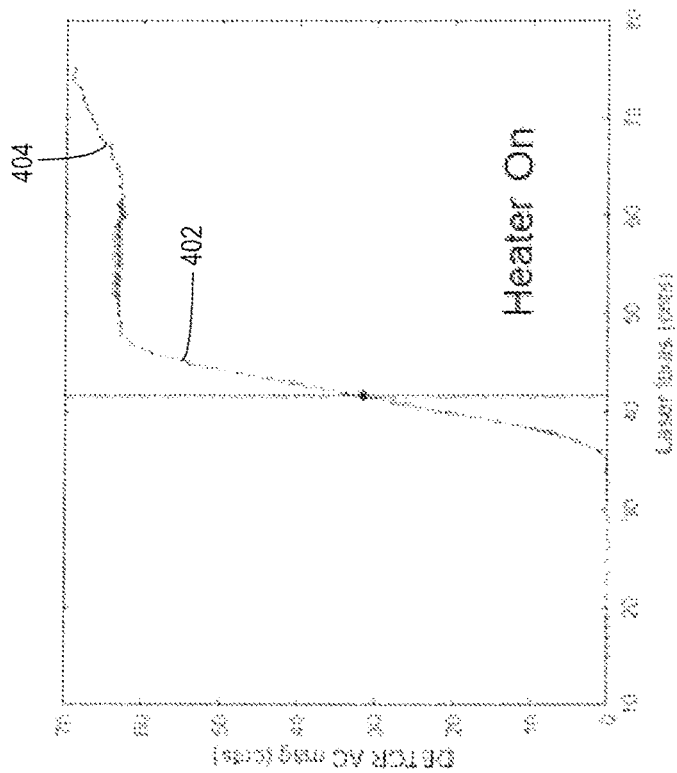
FIG. 5 shows the response of a thermal sensor of a HAMR slider at a passive clearance setting of the writer heater during a write operation in accordance with various embodiments.

FIG. 4 shows the response of a thermal sensor of a HAMR slider at an active clearance setting (heater on) of the writer heater during a write operation. FIG. 5 shows the response of the thermal sensor at a passive clearance setting (heater off) of the writer heater during a write operation. Curve 402 of FIG. 4 and curve 502 of FIG. 5 show the AC response of the thermal sensor as modulated current supplied to the laser diode is swept with the writer heater set at an active clearance setting (FIG. 4) and a passive clearance setting (FIG. 5). It is understood that, at an active clearance setting (heater on), the thermal sensor of the slider is closer to the recording medium than at the passive clearance setting (heater off). With the writer heater on, the region 404 of curve 402 in FIG. 4 has a discernible rise which corresponds to media back-heating detected by the thermal sensor. With the writer heater off, the region 504 of curve 502 in FIG. 5 does not have a discernible rise. FIGS. 4 and 5 demonstrate that a thermal sensor of a HAMR slider can measure media back-heating at an active clearance setting during write operations. For example, a thermal sensor can measure media back-heating at slider fly heights ranging between about 0 and 10 nm, such as between about 1 and 6 nm.

Figure 6:
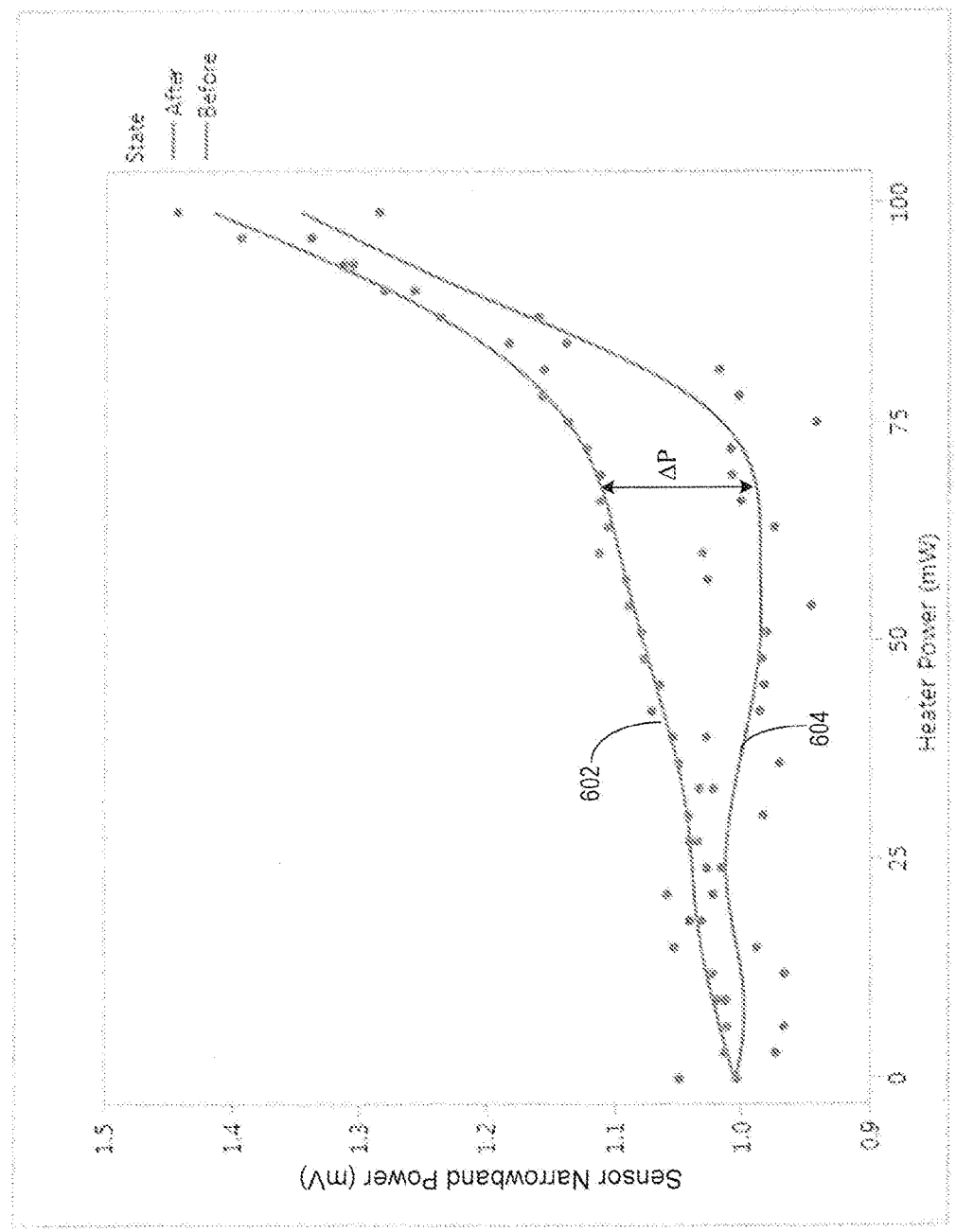
FIG. 6 is a graph showing the response of a thermal sensor of a HAMR slider before and after spin-stand life testing.

Referring now to FIG. 6, a spin-stand experiment was conducted on a HAMR slider which included a thermal sensor at or near the air bearing surface of the slider. The thermal sensor response was measured at the beginning of the experiment, which is shown as curve 602 in FIG. 6. At the beginning of the experiment, the NFT of the slider was considered new or fresh. The slider was subjected to spin-stand life testing during which repeated write operations were performed. Life testing was performed until the write performance of the slider degraded significantly due to degradation of the NFT. More particularly, life testing was performed until a bit error rate (BER) of about two decades was observed. Curve 604 in FIG. 6 shows the response of the thermal sensor at the end of spin-stand life testing, at which point the NFT of the slider was considered degraded (e.g., the slider was unusable or unreliable).

In FIG. 6, the data was acquired from the thermal sensor with a modulated current having a constant mean amplitude supplied to the laser diode while varying the writer heater power. The response of the thermal sensor (narrowband power in mV) was measured at the frequency of the modulated laser diode current. The difference in sensor signal power, AP, between curve 602 (fresh NFT) and 604 (degraded NFT) is indicative of a difference in media back-heating resulting from writing with the fresh NFT and writing with the degraded NFT. Because the mean amplitude of the modulated laser diode current was kept constant for the thermal sensor measurement and the location of the thermal sensor was not close enough to the NFT to actually measure NFT output, the cause for the change in sensor signal power, AP, in FIG. 6 is due to the thermal sensor interacting with the media back-heating trail.

According to some embodiments, thermal sensor response data (e.g., curve 602) can be produced at the beginning of a slider's service life and compared to subsequently produced thermal sensor response data to monitor performance changes (e.g., degradation) of the slider's NFT. A change in the thermal sensor response data beyond a predetermined threshold (e.g., a predetermined percentage or standard deviation change) can be detected as an indication of NFT degradation.

Embodiments of the disclosure are directed to apparatuses and methods for measuring a change in the response of a thermal sensor of a HAMR slider indicative of media back-heating. More particularly, embodiments are directed to monitoring performance of an NFT of a HAMR slider by measuring changes in media back-heating using a thermal sensor of the HAMR slider. According to various embodiments, a thermal sensor of a HAMR slider can be characterized across the stroke at the associated laser diode current and write settings. While performing write operations, the response of the thermal sensor to media back-heating is measured. Changes in the response of the thermal sensor are measured and, if exceeding a threshold, such changes can indicate degradation of the NFT. Changes in the thermal sensor response beyond the threshold can trigger further checks and characterization of the NFT and/or other remedial action.

Figure 7:
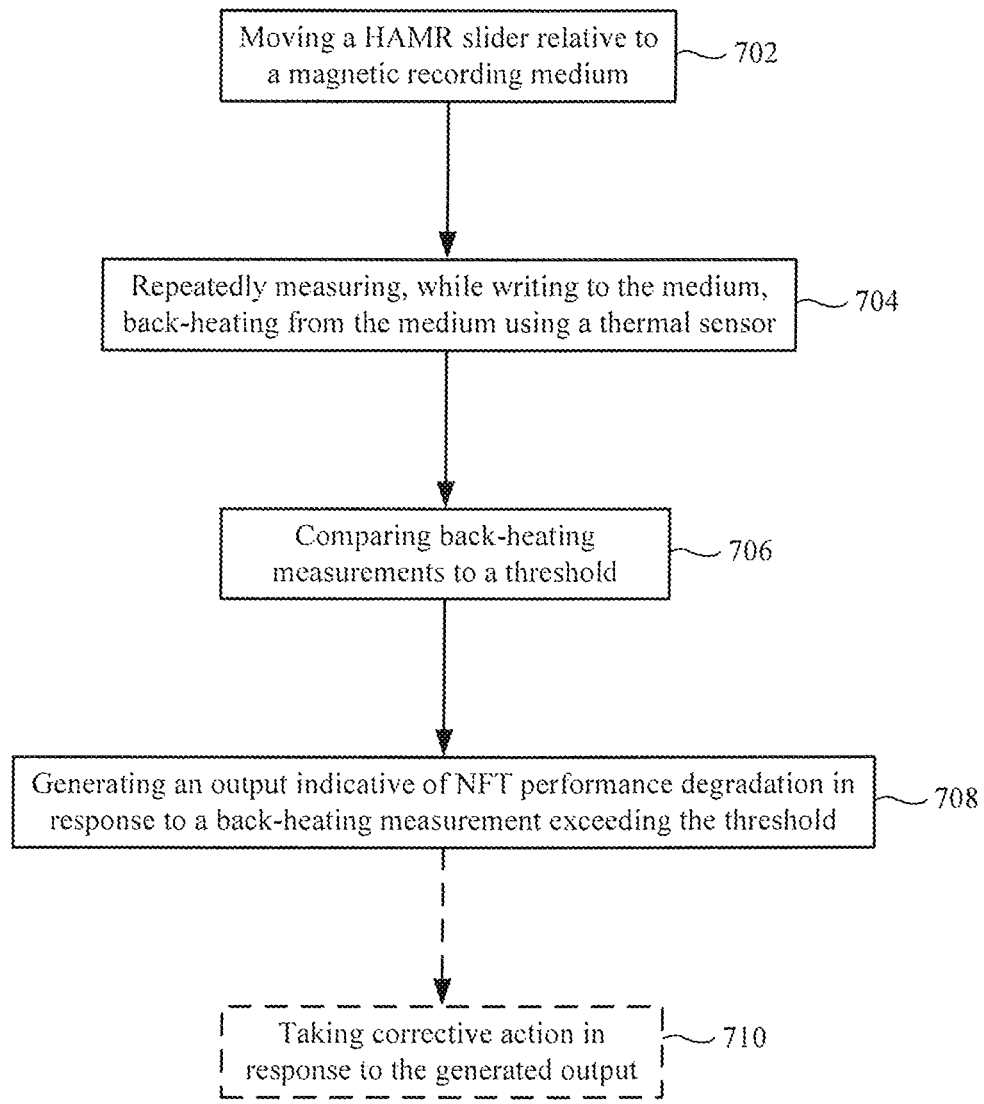
FIG. 7 illustrates a method of monitoring performance of an NFT of a HAMR slider in accordance with various embodiments.

FIG. 7 illustrates a method of monitoring NFT performance using media back-heating measurements in accordance with various embodiments. The method shown in FIG. 7 involves moving 702 a HAMR slider relative to a magnetic recording medium. The method involves repeatedly measuring 704, while writing to the medium, back-heating from the medium using a thermal sensor. During writing, DC or modulated current can be supplied to the laser diode. Measuring the media back-heating can involve measuring a DC or an AC response of the thermal sensor. The method also involves comparing 706 back-heating measurements to a threshold. The method further involves generating 708 an output indicative of NFT performance degradation in response to a back-heating measurement exceeding the threshold. According to some embodiments, the method can also involve taking corrective action 710 in response to the generated output. The corrective action can involve performing further health checks of the NFT, further characterization of the NFT, and/or communicating a signal to a drive controller or a host indicating degradation of the NFT.

According to some embodiments, the processes shown in FIG. 7 (and other figures) are implemented while writing preamble data to a sector of the recording medium. By characterizing the response of the thermal sensor at data preamble conditions, a special pattern that takes test time does not have to be developed. Moreover, characterizing the thermal sensor response while writing preamble data is preferred over performing the characterization while writing customer data to the sector, which would make accurate characterization of the thermal sensor response more challenging.

The method shown in FIG. 7 (and other figures) involves measuring 704 a response of a thermal sensor to media back-heating for purposes of detecting changes in NFT performance. In some embodiments, measuring the thermal sensor signal and changes of the sensor signal can involve measuring the sensor signal at a frequency corresponding to the frequency of modulated current supplied to the laser diode (e.g., via notch or narrowband filtering or signal processing using a Fast Fourier Transform of the signal). In other embodiments, measuring the thermal sensor signal and changes of the sensor signal can involve measuring a DC response of the thermal sensor. Generating an output indicative of NFT performance degradation can involve comparing the measured sensor signal to a threshold, such as a predetermined percentage change (e.g., >20%), magnitude change, or standard deviation of the measured sensor signal. If the measured sensor signal exceeds the threshold, an output indicative of NFT performance degradation can be generated and corrective action taken.

Figure 8A:
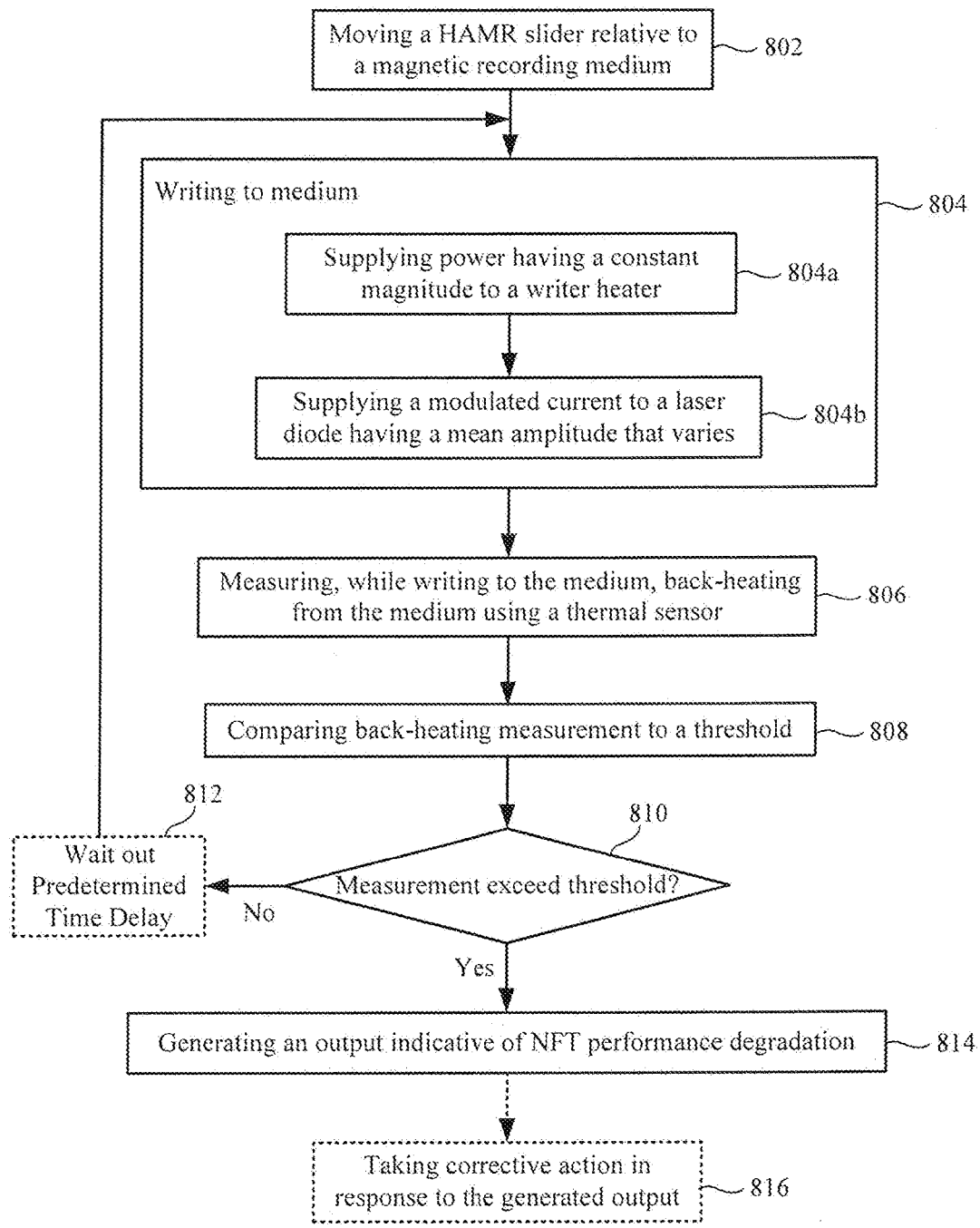
FIG. 8A illustrates a method of monitoring performance of an NFT of a HAMR slider in accordance with various embodiments.
Figure 8B:
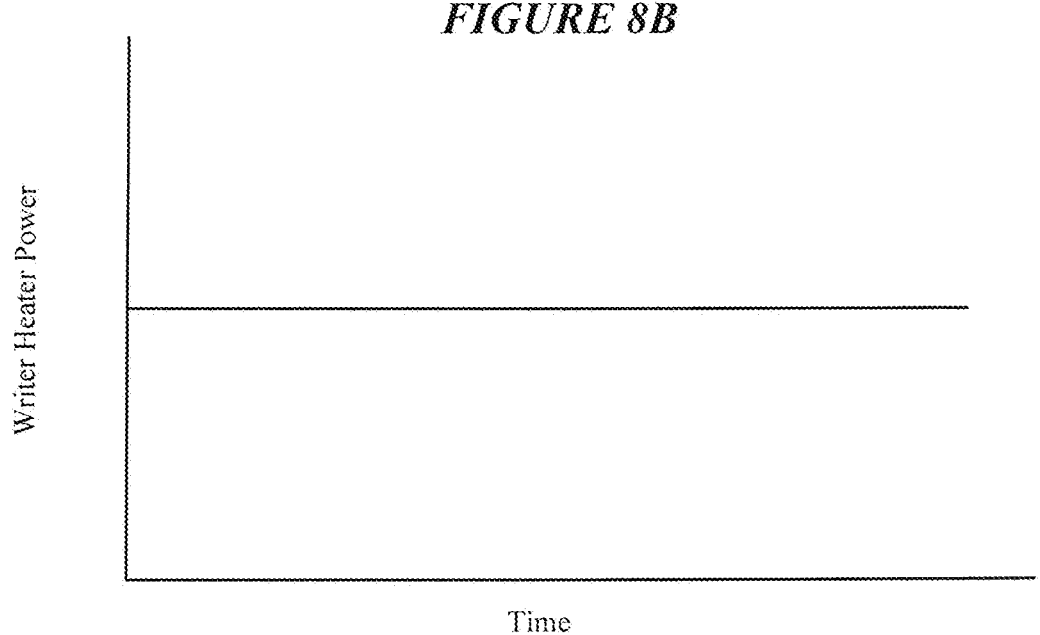
FIGS. 8B and 8C respectively show writer heater and modulated laser diode current curves for the NFT performance monitoring method illustrated in FIG. 8A.
Figure 8C:
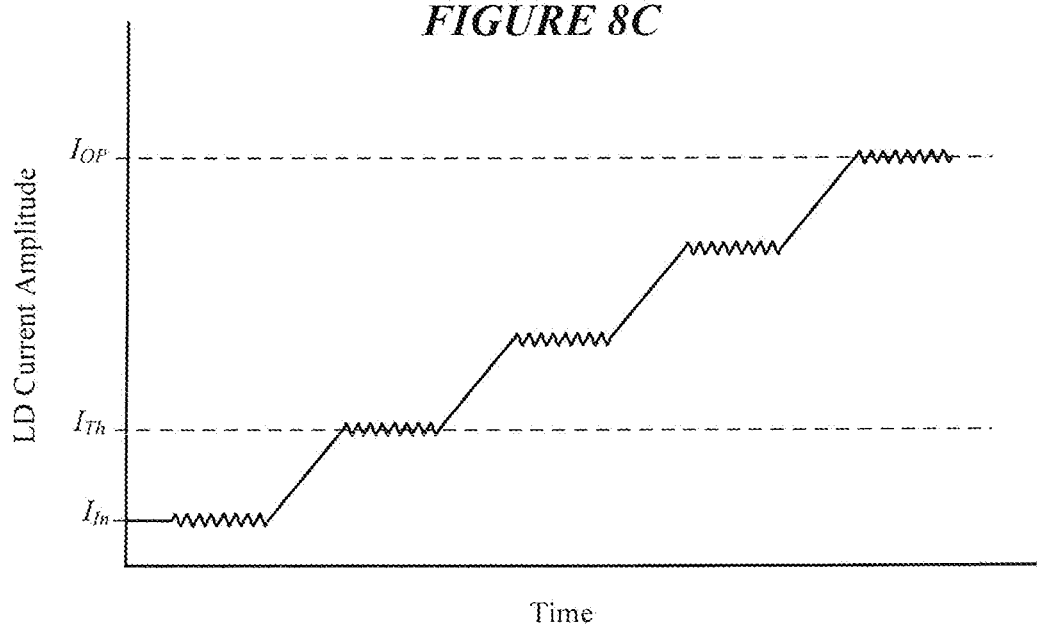

FIG. 8A illustrates a method of monitoring NFT performance using media back-heating measurements in accordance with various embodiments. The method shown in FIG. 8A involves moving 802 a HAMR slider relative to a magnetic recording medium. The method involves writing (e.g., preamble data) to the medium. In the embodiment shown in FIG. 8A, writing 804 to the medium involves supplying 804a power having a constant magnitude to a writer heater of the HAMR slider (see, e.g., FIG. 8B). Writing to the medium 804 also involves supplying 804b a modulated current having a mean amplitude that varies to the laser diode of the HAMR slider (see, e.g., FIG. 8C).

In the embodiment shown in FIG. 8A and in other figures, the modulated current can have a frequency between about 3 kHz and 10 MHz. Varying the modulated current can involve sweeping the modulated current between a minimum and a maximum. For example, and with reference to FIG. 8C, the minimum can be a modulated current below a threshold current, $I_{Th}$, of the laser diode, and the maximum can be a modulated current, $I_{OP}$, needed to write or erase data to/from the recording medium. It is noted that the initial current level, $I_{In}$, is preferably a current below the threshold current, $I_{Th}$, of the laser diode, which can be a zero current level.

While supplying 804a constant power to the writer heater and sweeping 804b the modulated current supplied to the laser diode, the method involves measuring 806 back-heating from the medium using a thermal sensor. Measuring 806 media back-heating can involve measuring the thermal sensor response at a frequency corresponding to the frequency of the modulated current supplied to the laser diode, such as in a manner previously described. The back-heating measurement made by the thermal sensor is compared 808 to a threshold. A check 810 is made to determine if the measurement exceeds the threshold. If not, the processes of blocks 804-810 are repeated. In some embodiments, the processes of blocks 804-810 are repeated on a continuous (e.g., real-time) basis. In other embodiments, the processes of blocks 804-810 are repeated after a predetermined time delay 812. The predetermined time can be a predetermined number of hours or days, for example. If the back-heating measurement exceeds the threshold 810, an output is generated 814 indicating that degradation in NFT performance has been detected. Various forms of corrective action can be taken 816 in response to the generated output, such as those previously discussed.

Figure 9A:
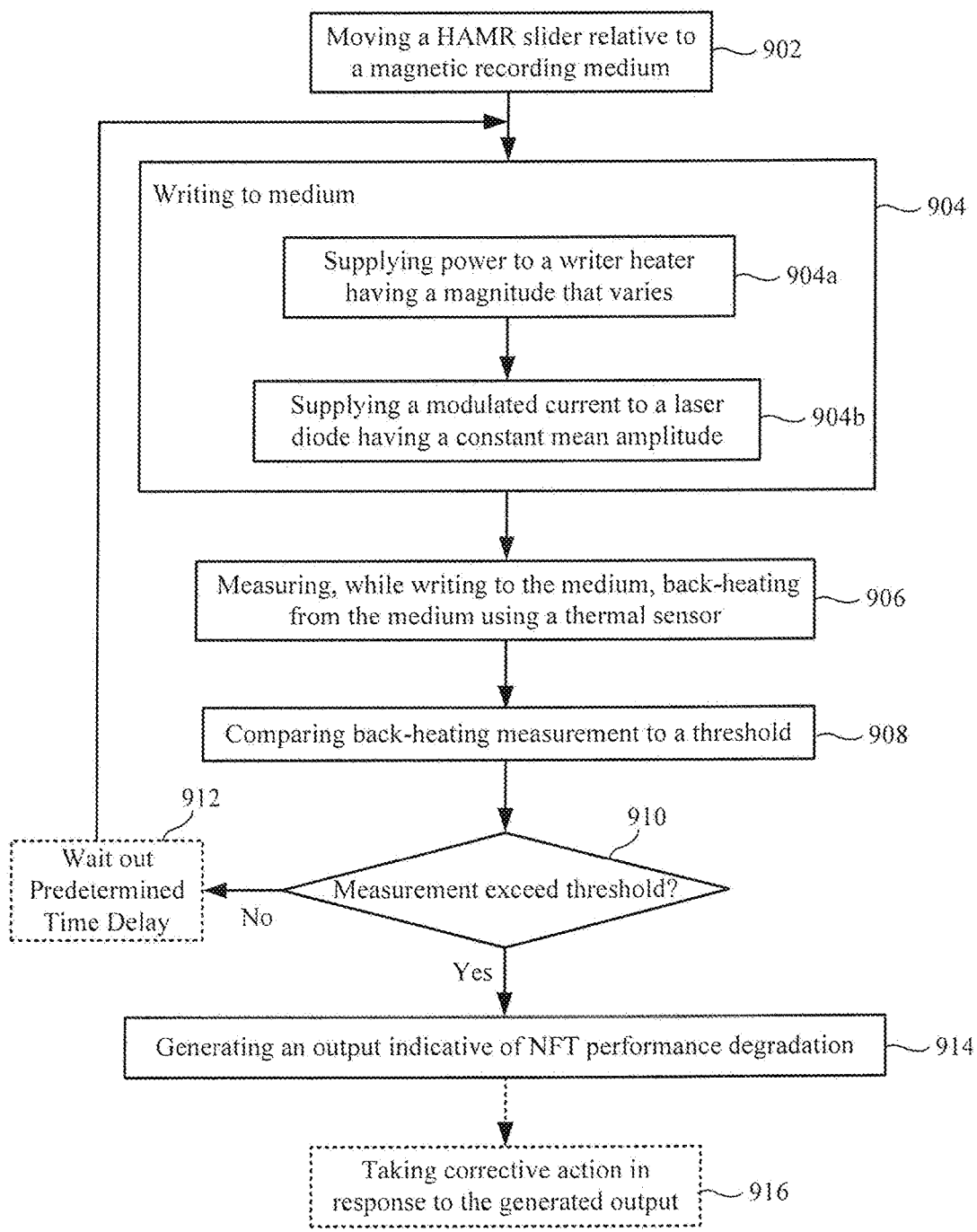
FIG. 9A illustrates a method of monitoring performance of an NFT of a HAMR slider in accordance with various embodiments.
Figure 9B:
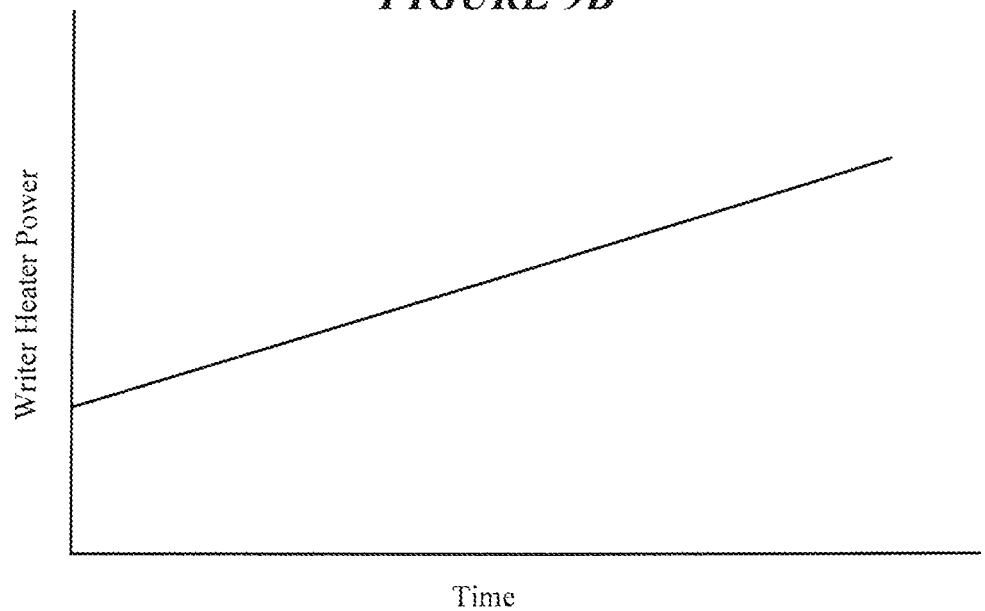
FIGS. 9B and 9C respectively show writer heater and modulated laser diode current curves for the NFT performance monitoring method illustrated in FIG. 9A.
Figure 9C:
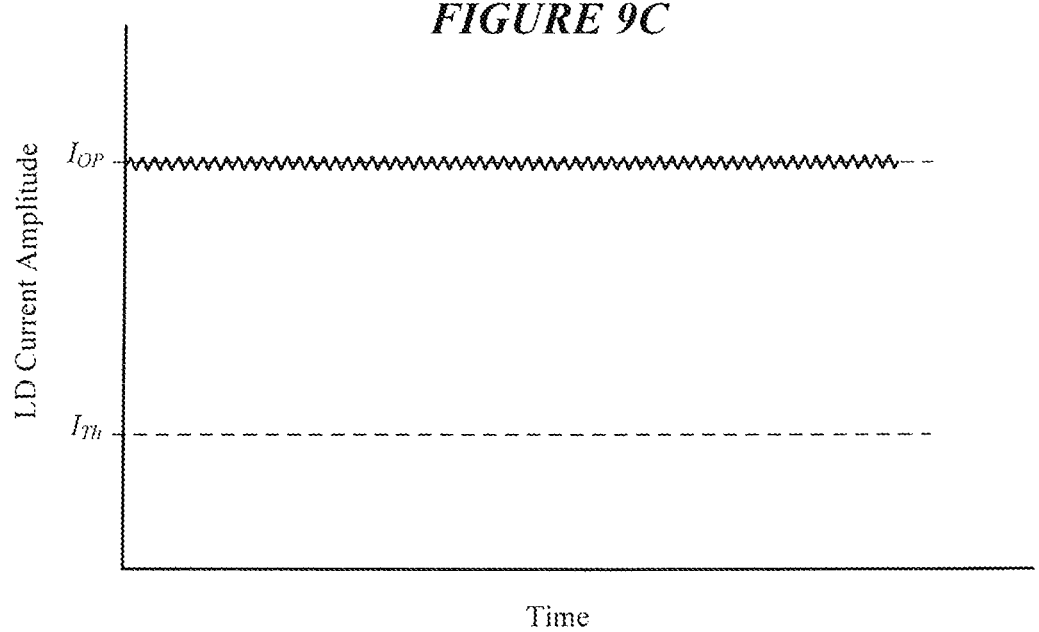

FIG. 9A illustrates a method of monitoring NFT performance using media back-heating measurements in accordance with various embodiments. The method shown in FIG. 9A involves moving 902 a HAMR slider relative to a magnetic recording medium. The method involves writing 904 (e.g., preamble data) to the medium. In the embodiment shown in FIG. 9A, writing 904 to the medium involves supplying 904a power having a magnitude that varies to a writer heater of the HAMR slider (see, e.g., FIG. 9B). Varying the writer heater power can involve sweeping the writer heater power between a minimum power level and a maximum power level. For example, the minimum power level can be zero power which can result in a maximum fly height of the slider. The maximum power level can be a magnitude of writer heater power that produces a protrusion of the slider sufficient in size to cause near contact between the slider and the recording medium. Writing to the medium 904 also involves supplying 904b a modulated current having a constant mean amplitude to the laser diode of the HAMR slider (see, e.g., FIG. 9C). The constant mean amplitude can be a current level at or near, $I_{OP}$, needed for writing or erasing data to/from the recording medium. Reference is made to FIG. 9C which shows a modulated current having a constant mean amplitude, $I_{OP}$, which is supplied to the laser diode.

While varying the power supplied 904a to the writer heater and supplying 904b modulated current having a constant mean amplitude to the laser diode, the method involves measuring 906 back-heating from the medium using a thermal sensor. Measuring 906 media back-heating can involve measuring the thermal sensor response at a frequency corresponding to the frequency of the modulated current supplied to the laser diode, such as in the manner previously described. The back-heating measurement made by the thermal sensor is compared 908 to a threshold. A check 910 is made to determine if the measurement exceeds the threshold. In some embodiments, the processes of blocks 904-910 are repeated on a continuous (e.g., real-time) basis. In other embodiments, the processes of blocks 904-910 are repeated after a predetermined time delay 912. If the back-heating measurement exceeds the threshold 910, an output is generated 914 indicating that degradation in NFT performance has been detected. Various forms of corrective action can be taken 916 in response to the generated output, such as those previously discussed.

Figure 10A:
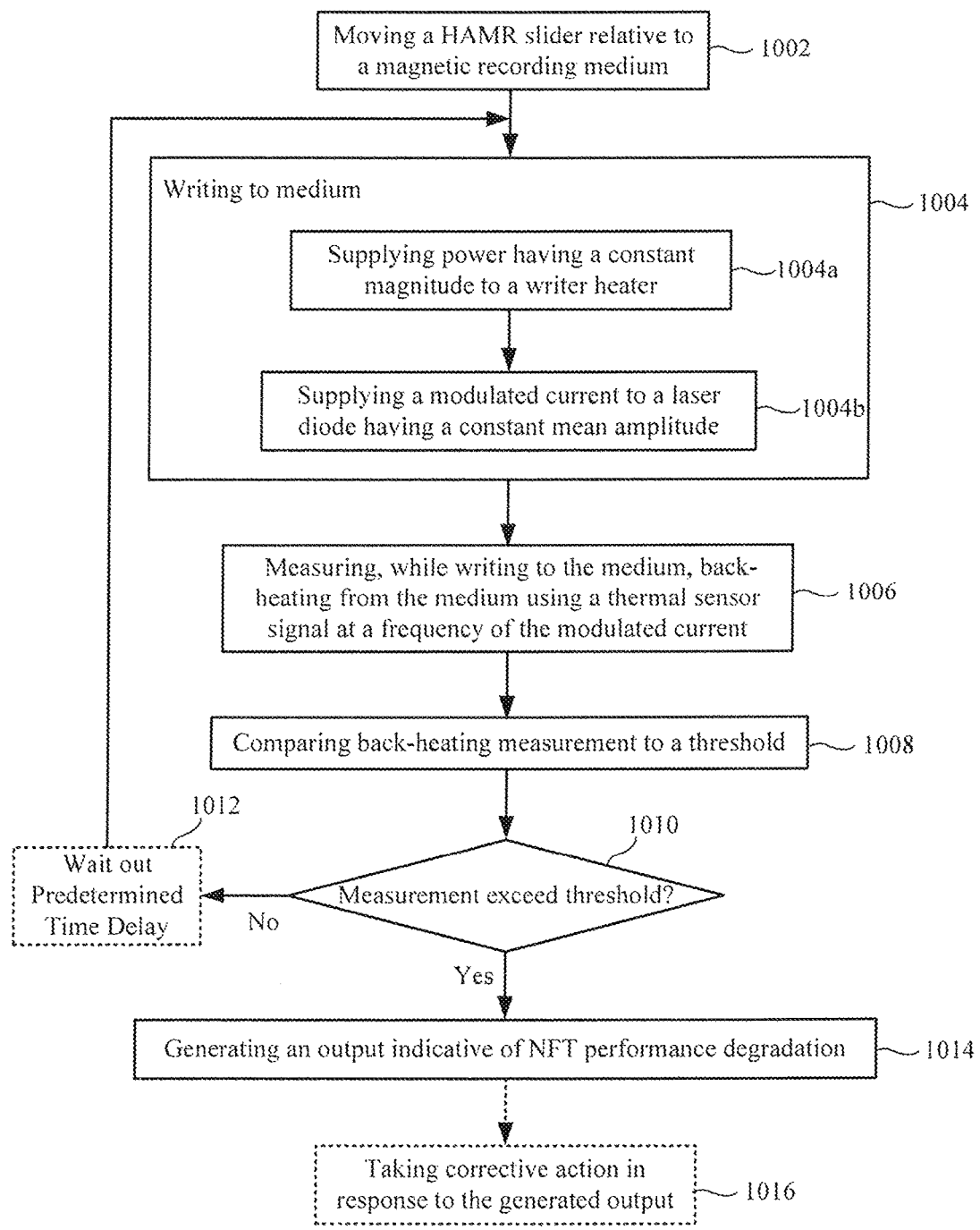
FIG. 10A illustrates a method of monitoring performance of an NFT of a HAMR slider in accordance with various embodiments.
Figure 10B:
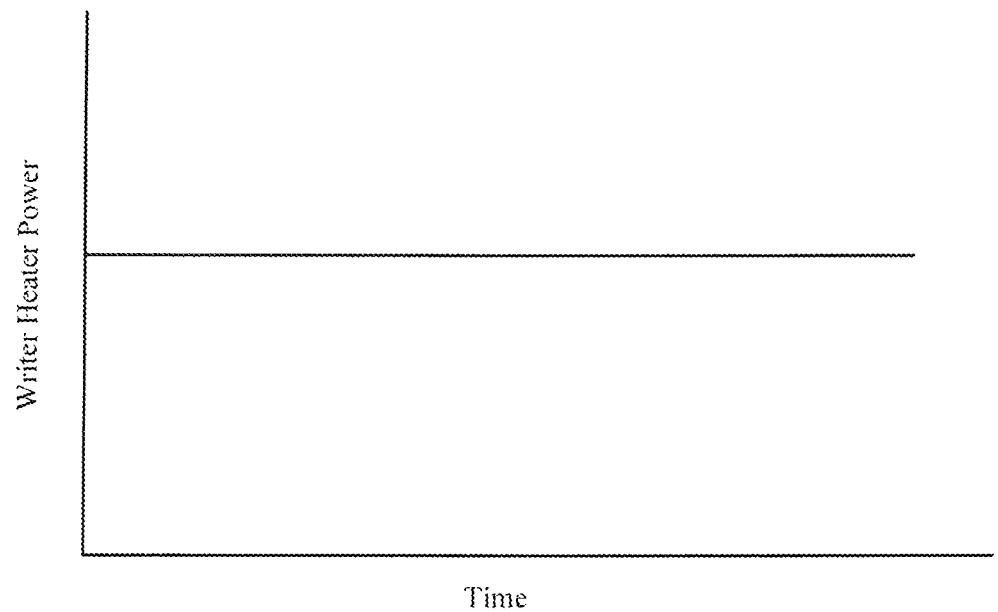
FIGS. 10B and 10C respectively show writer heater and modulated laser diode current curves for the NFT performance monitoring method illustrated in FIG. 10A.
Figure 10C:
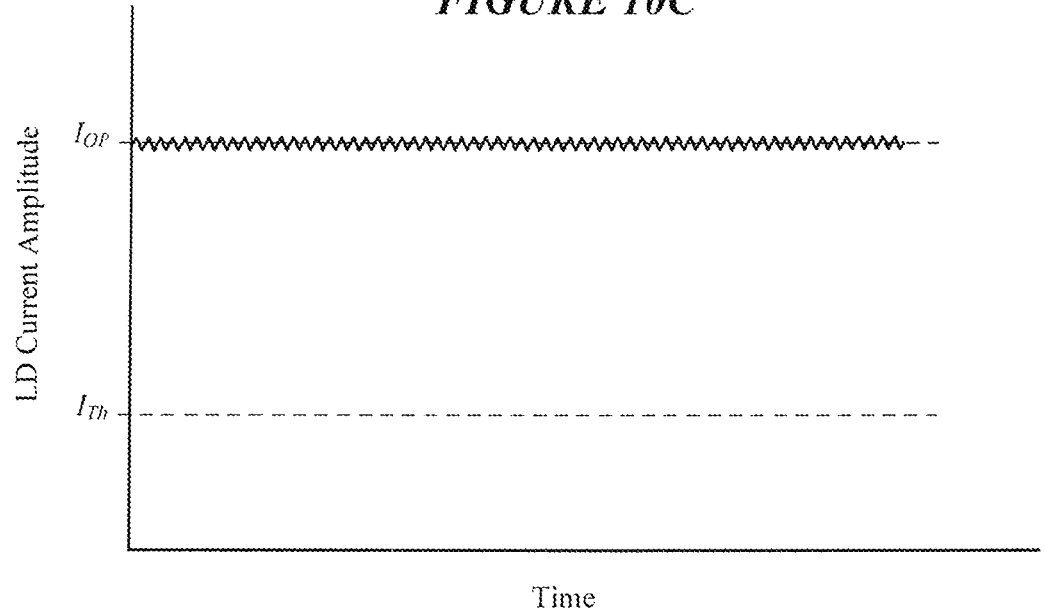

FIG. 10A illustrates a method of monitoring NFT performance using media back-heating measurements in accordance with various embodiments. The method shown in FIG. 10A involves moving 1002 a HAMR slider relative to a magnetic recording medium. The method involves writing 1004 (e.g., preamble data) to the medium. In the embodiment shown in FIG. 10A, writing 1004 to the medium involves supplying 1004a power having a constant magnitude to a writer heater of the HAMR slider (see, e.g., FIG. 10B). Writing to the medium 1004 also involves supplying 1004b a modulated current having a constant mean amplitude to the laser diode of the HAMR slider (see, e.g., FIG. 10C). The constant mean amplitude can be a current level at or near, $I_{OP}$, needed for writing or erasing data to/from the recording medium.

While supplying 1004a power having a constant magnitude to the writer heater and supplying 1004b modulated current having a constant mean amplitude to the laser diode, the method involves measuring 1006 back-heating from the medium using a thermal sensor. Measuring 1006 media back-heating involves measuring the thermal sensor response at a frequency corresponding to the frequency of the modulated current supplied to the laser diode, such as in the manner previously described. The back-heating measurement made by the thermal sensor is compared 1008 to a threshold. A check 1010 is made to determine if the measurement exceeds the threshold. In some embodiments, the processes of blocks 1004-1010 are repeated on a continuous (e.g., real-time) basis. In other embodiments, the processes of blocks 1004-1010 are repeated after a predetermined time delay 1012. If the back-heating measurement exceeds the threshold 1010, an output is generated 1014 indicating that degradation in NFT performance has been detected. Various forms of corrective action can be taken 1016 in response to the generated output, such as those previously discussed.

Figure 11:
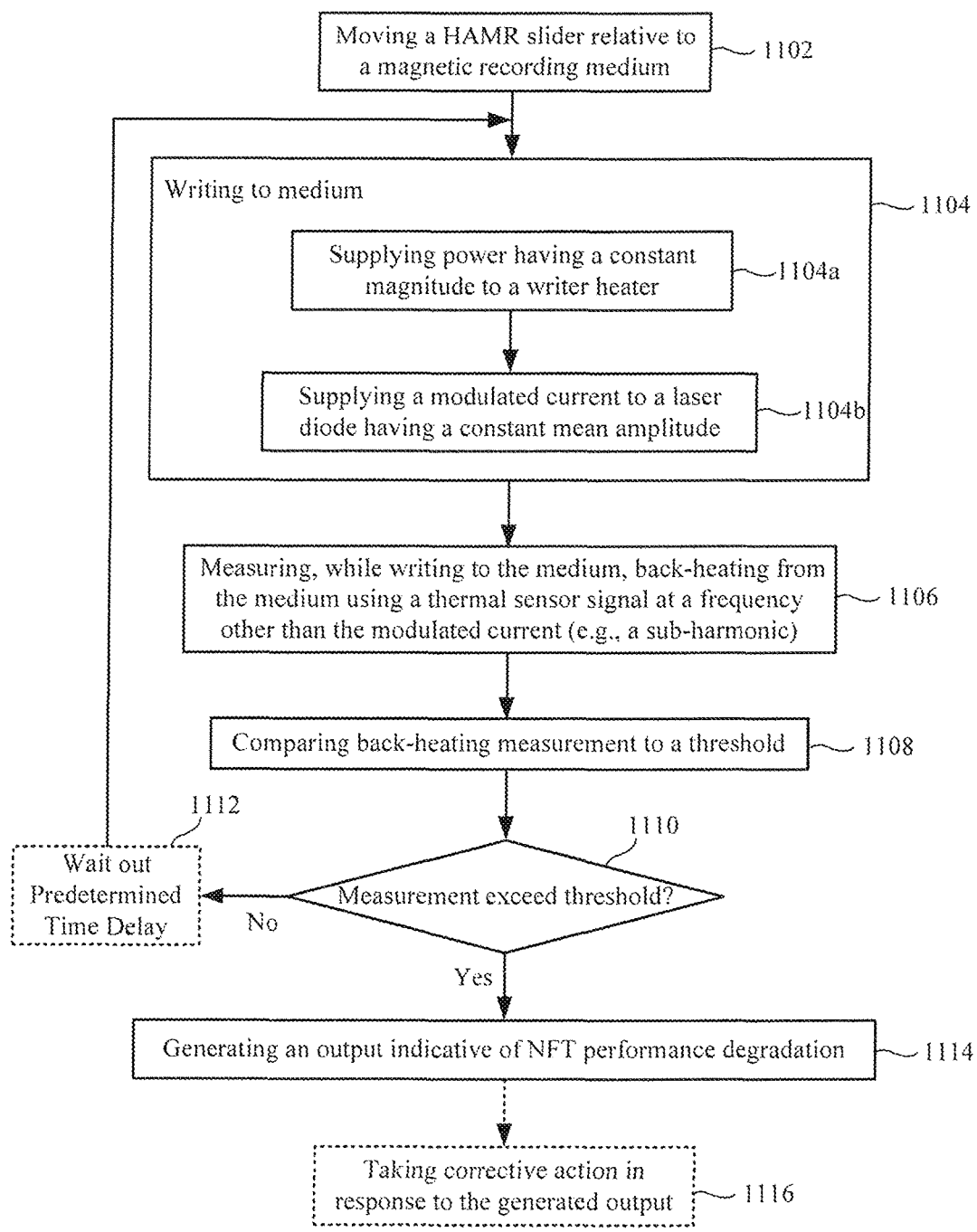
FIG. 11 illustrates a method of monitoring performance of an NFT of a HAMR slider in accordance with various embodiments.

FIG. 11 illustrates a method of monitoring NFT performance using media back-heating measurements in accordance with various embodiments. The method shown in FIG. 11 involves moving 1102 a HAMR slider relative to a magnetic recording medium. The method involves writing 1104 (e.g., preamble data) to the medium. In the embodiment shown in FIG. 11, writing 1104 to the medium involves supplying 1104a power having a constant magnitude to a writer heater of the HAMR slider (see, e.g., FIG. 10B). Writing to the medium 1104 also involves supplying 1104b a modulated current having a constant mean amplitude to the laser diode of the HAMR slider (see, e.g., FIG. 10C). The constant mean amplitude can be a current level at or near, $I_{OP}$, needed for writing or erasing data to/from the recording medium.

While supplying 1104a power having a constant magnitude to the writer heater and supplying 1104b modulated current having a constant mean amplitude to the laser diode, the method involves measuring 1106 back-heating from the medium using a thermal sensor. More particularly, measuring 1106 media back-heating involves measuring the thermal sensor response at a frequency other than the frequency of the modulated current supplied to the laser diode. For example, the thermal sensor response can be measured at a subharmonic frequency of the modulated current frequency. The back-heating measurement made by the thermal sensor is compared 1108 to a threshold. A check 1110 is made to determine if the measurement exceeds the threshold. In some embodiments, the processes of blocks 1104-1110 are repeated on a continuous (e.g., real-time) basis. In other embodiments, the processes of blocks 1104-1110 are repeated after a predetermined time delay 1112. If the back-heating measurement exceeds the threshold 1110, an output is generated 1114 indicating that degradation in NFT performance has been detected. Various forms of corrective action can be taken 1116 in response to the generated output, such as those previously discussed.

Figure 12:
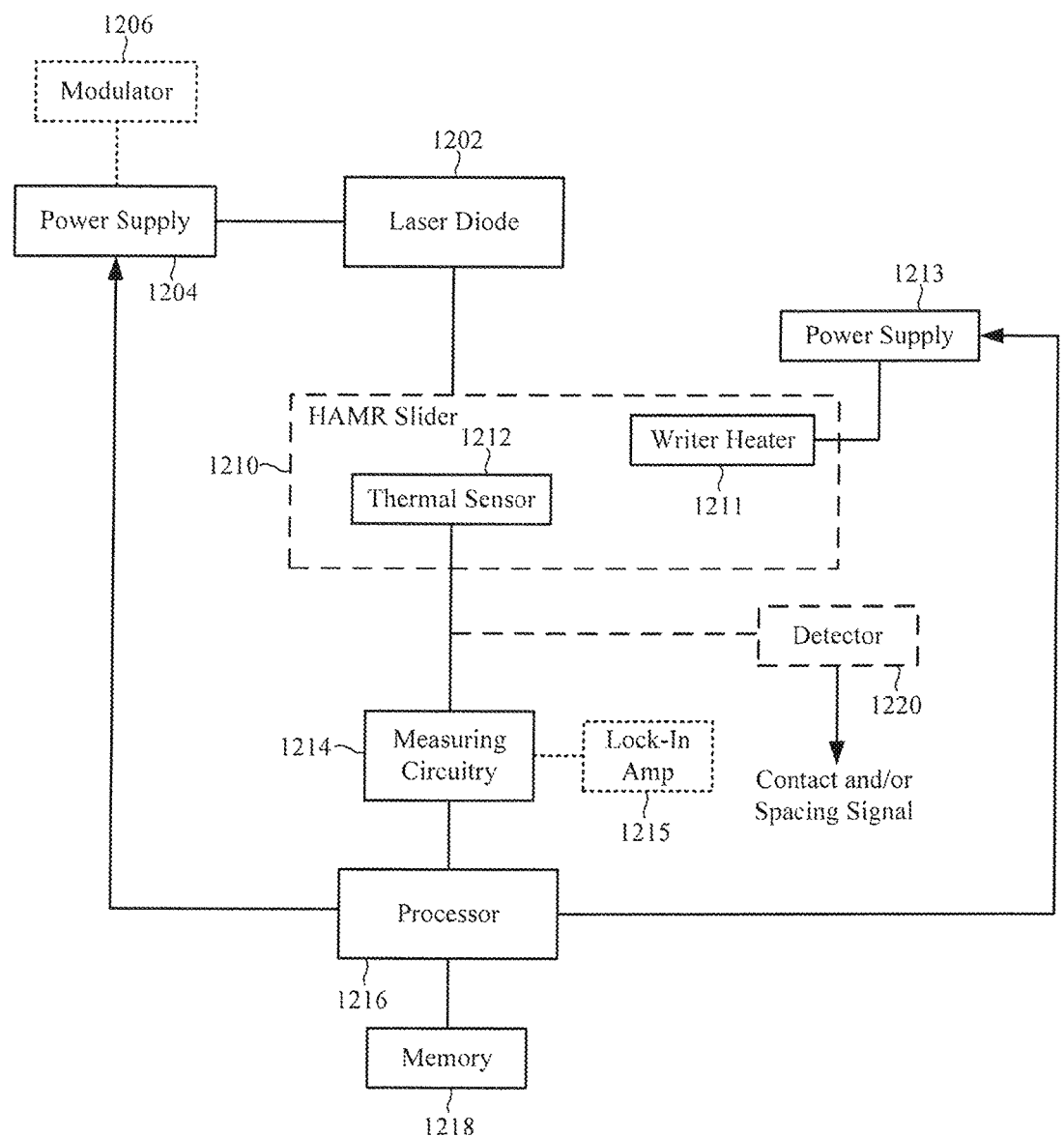
FIG. 12 is a block diagram of a system for implementing any of the NFT performance monitoring methodologies described herein in accordance with various embodiments.

FIG. 12 is a block diagram of a system for monitoring NFT performance via changes in media back-heating in a HAMR drive in accordance with various embodiments. The system illustrated in FIG. 12 can be used to implement any of the media back-heating measuring methodologies described hereinabove as directed by a processor 1216 of the system. The system shown in FIG. 12 includes a light source 1202, such as a laser diode, coupled to a power supply 1204. In some embodiments, the laser-diode power supply 1204 supplies direct current to the laser diode 1202. In other embodiments, the laser-diode power supply 1204 is coupled to or incorporates a modulator 1206 which, together, produce a modulated current which is supplied to the laser diode 1202. Depending on the detection method employed, the modulated current produced by the laser-diode power supply 1204 and modulator 1206 can have a constant or varying mean amplitude. Light (modulated or unmodulated) produced by the laser diode 1202 is communicated to a HAMR slider 1210 which, among other components, includes a thermal sensor 1212 and a writer heater 1211. Although not shown, it is understood that the slider 1210 includes an NFT and a writer. A power supply 1213 is coupled to the writer heater 1211. Depending on the measuring method employed, the writer-heater power supply 1213 can supply power having a constant or varying magnitude to the writer heater 1211.

The thermal sensor 1212 is positioned on the HAMR slider 1210 at a location where temperature changes of the thermal sensor 1212 correspond to changes in media back-heating. For example, the thermal sensor 1212 can be positioned at or near the air bearing surface of the slider 1210. In some embodiments, the thermal sensor 1212 is implemented as a contact sensor and coupled to a detector 1220. The detector 1220 is configured to detect a signal produced by the sensor 1212 indicative of contact and/or changes in spacing between the slider 1210 and a magnetic recording medium.

Measuring circuitry 1214 is coupled to the thermal sensor 1212. The measuring circuitry 1214 is configured to monitor a signal produced by the thermal sensor 1212 during write operations and measure a response of the sensor signal indicative of media back-heating. In some embodiments, the measuring circuitry 1214 measures a DC signal indicative of media back-heating produced by the thermal sensor 1212. In other embodiments, the measuring circuitry 1214 can include or be coupled to a lock-in amplifier 1215 configured to detect changes in the sensor signal within a predetermined passband, such as the fundamental or subharmonic frequency of the modulated current frequency supplied to the laser diode 1202. In further embodiments, the measuring circuitry 1214 can incorporate or be coupled to a processor configured to perform an FFT on the sensor signal and detect a response at a predetermined frequency (e.g., the fundamental or subharmonic frequency of the modulated current frequency supplied to the laser diode 1202) indicative of media back-heating.

The measuring circuitry 1214 includes a comparator configured to compare the magnitude of the thermal sensor signal to a predetermined threshold, which if exceeded indicates a reduction in NFT temperature indicative of NFT degradation. The measuring circuitry 1214 is coupled to the processor 1216, which is configured to coordinate the media back-heating measuring processes implemented by the system shown in FIG. 12. In response to detecting NFT degradation by the measuring circuitry 1214, the processor 1216 can implement a corrective action, such as any of those previously described.

Figure 13:
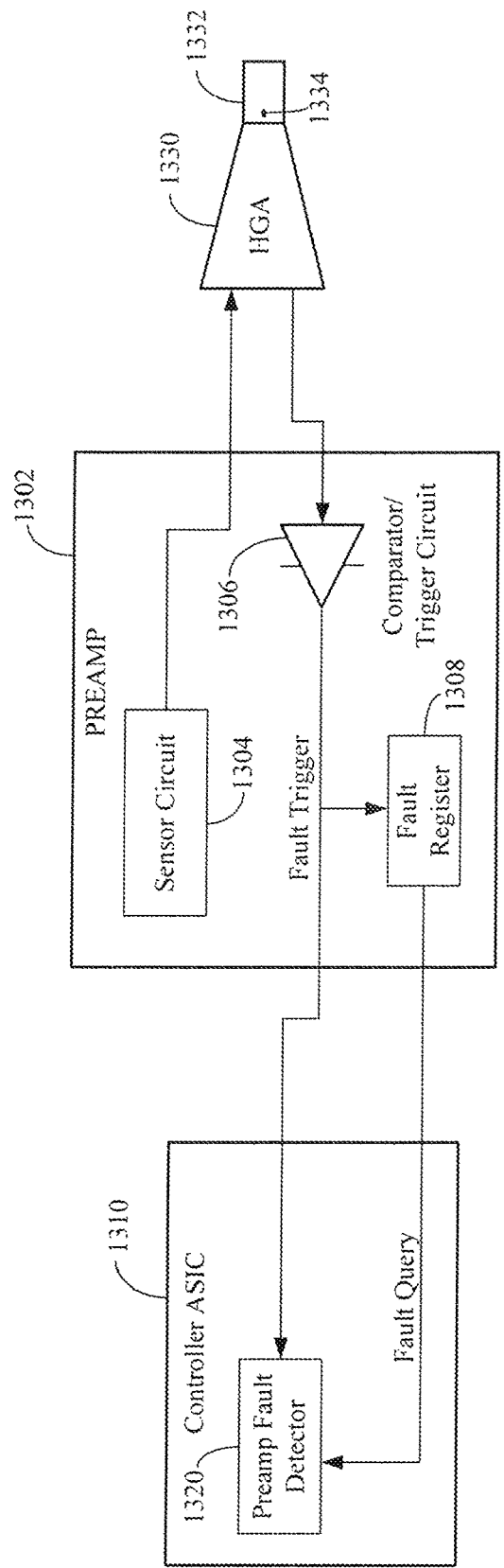
FIG. 13 illustrates representative HAMR drive architecture for implementing any of the NFT performance monitoring methodologies described herein in accordance with various embodiments.

FIG. 13 illustrates representative architecture of a HAMR drive configured to implement any of the media back-heating measuring methodologies described hereinabove in accordance with various embodiments. The HAMR drive architecture shown in FIG. 13 includes a preamplifier 1302 coupled to a controller ASIC (application specific integrated circuit) 1310. The preamplifier 1302 includes a sensor circuit 1304, a comparator/trigger circuit 1306, and a fault register 1308. The preamplifier 1302 is shown coupled to a head gimbal assembly (HGA) 1330 which supports a HAMR slider 1332. Among other components, the slider 1332 includes a thermal sensor 1334. The thermal sensor 1334 is coupled to the sensor circuit 1304 and an input of the comparator/trigger circuit 1306 of the preamplifier 1302. An output of the comparator/trigger circuit 1306 is coupled to the fault register 1308 and the preamp fault detector 1320 of the controller ASIC 1310.

The comparator/trigger circuit 1306 serves as a threshold detector of the preamplifier 1302. The comparator/trigger circuit 1306 monitors the signal produced by the thermal sensor 1334 for an out of range condition relative to a predetermined threshold or threshold range. If the thermal sensor signal is outside of the threshold or threshold range, the comparator/trigger circuit 1306 triggers a preamp fault to the fault register 1308 and the preamp fault detector 1320 of the controller ASIC 1310. In response to receiving the fault trigger, the controller ASIC 1310 queries the preamp fault detector 1320 to determine if the source of the fault was a "sensor out of range of expected" fault. In response to determining that the source of the fault was due to an out of range condition of the sensor signal, the controller ASIC 1310 can take various forms of remedial action, such as those previously described. For example, the controller ASIC 1310 can force a fault that informs the HAMR drive of degradation in the NFT. Spurious faults can cause the system to recalibrate the thermal sensor and/or detection thresholds.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
moving a slider configured for heat-assisted magnetic recording relative to and spaced apart from a magnetic recording medium, the slider comprising a writer, a writer heater, a thermal sensor situated at or near an air bearing surface of the slider, and a near-field transducer (NFT);
repeatedly measuring, with the slider at a fly height of less than about 10 nm and while the NFT generates heat when writing to the medium, back-heating from the medium using the thermal sensor;
comparing back-heating measurements made by the thermal sensor to a threshold; and
generating an output signal indicative of NFT performance degradation in response to a back-heating measurement exceeding the threshold.

2. The method of claim 1, wherein the threshold is based on a back-heating measurement made during manufacture of a hard disk drive that incorporates the slider and the medium.

3. The method of claim 1, comprising taking corrective action in response to the output signal, wherein the corrective action comprises an action to further characterize performance of the NFT.

4. The method of claim 1, wherein measuring the back-heating comprises measuring a DC response of the thermal sensor.

5. The method of claim 1, comprising supplying power to the writer heater to cause the slider to move toward the medium, wherein:
writing to the medium comprises supplying a modulated current to a laser diode of or near the slider to produce modulated light that is communicated to the NFT; and
measuring the back-heating comprises measuring an AC response of the thermal sensor at a frequency of the modulated current or a subharmonic of the frequency of the modulated current.

6. The method of claim 5, wherein:
supplying power comprises supplying power having a constant magnitude to the writer heater; and
supplying the modulated current comprises supplying the modulated current to the laser diode having a mean amplitude that is constant.

7. The method of claim 5, wherein:
supplying power comprises supplying power having a constant magnitude to the writer heater; and
supplying the modulated current comprises supplying the modulated current to the laser diode having a mean amplitude that varies.

8. The method of claim 5, wherein:
supplying power comprises supplying power having a magnitude that varies to the writer heater; and
supplying the modulated current comprises supplying the modulated current to the laser diode having a constant mean amplitude.

9. The method of claim 1, wherein the back-heating is measured when writing preamble data to the medium.

10. An apparatus, comprising:
a laser diode configured to generate light during a write operation;
a slider comprising a near-field transducer (NFT) and an optical waveguide, the slider configured for heat-assisted magnetic recording and to communicate the light to the NFT via the waveguide;
a writer heater of the slider configured to receive power during the write operation;
a thermal sensor situated at or near an air bearing surface of the slider, the thermal sensor configured to produce a sensor signal in response to sensing back-heating from a magnetic recording medium while the slider is spaced apart from the medium by less than about 10 nm and the NFT generates heat during a write operation; and
circuitry coupled to the thermal sensor, the circuitry configured to compare the sensor signal to a threshold and generate an output signal indicative of degradation of NFT performance in response to the sensor signal exceeding the threshold.

11. The apparatus of claim 10, wherein the threshold is based on a back-heating measurement made during manufacture of a hard disk drive that incorporates the apparatus.

12. The apparatus of claim 10, comprising a processor configured to take corrective action in response to the output signal, wherein the corrective action comprises an action to further characterize performance of the NFT.

13. The apparatus of claim 10, wherein the sensor signal is a DC signal measured by the circuitry.

14. The apparatus of claim 10, wherein the sensor signal is an AC signal measured by the circuitry at a frequency of modulated current received by the laser diode or a subharmonic of the frequency of the modulated current.

15. The apparatus of claim 14, wherein:
the power received by the writer heater has a constant magnitude; and
modulated current received by the laser diode has a constant mean amplitude.

16. The apparatus of claim 14, wherein:
the power received by the writer heater has a constant magnitude; and
modulated current received by the laser diode has a mean amplitude that varies.

17. The apparatus of claim 14, wherein:
the power received by the writer heater has a magnitude that varies; and
modulated current received by the laser diode has a constant mean amplitude.

18. The apparatus of claim 1, wherein thermal sensor is configured to generate the sensor signal when preamble data is written to the medium.

* * * * *